(12) United States Patent
Kagawa et al.

(10) Patent No.: US 10,795,696 B2
(45) Date of Patent: Oct. 6, 2020

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventors: Atsushi Kagawa, Kanagawa (JP); Kengo Tokuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 123 days.

(21) Appl. No.: 15/890,879

(22) Filed: Feb. 7, 2018

(65) Prior Publication Data
US 2018/0357081 A1 Dec. 13, 2018

(30) Foreign Application Priority Data
Jun. 9, 2017 (JP) .................................. 2017-114120

(51) Int. Cl.
*G06F 9/451* (2018.01)
*G06F 3/0484* (2013.01)
*G06F 3/0482* (2013.01)
*G06F 3/0488* (2013.01)

(52) U.S. Cl.
CPC ............ *G06F 9/451* (2018.02); *G06F 3/0482* (2013.01); *G06F 3/04847* (2013.01); *G06F 3/0484* (2013.01); *G06F 3/04886* (2013.01)

(58) Field of Classification Search
CPC .... G06F 9/451; G06F 3/0482; G06F 3/04847; G06F 3/0484; G06F 3/04886
See application file for complete search history.

(56) References Cited

U.S. PATENT DOCUMENTS

| 5,343,409 A * | 8/1994 | Satterfield ............. G06F 9/4488 709/223 |
| 5,459,866 A | 10/1995 | Akiba et al. |
| 2004/0194065 A1* | 9/2004 | McGrath ................... G06F 9/44 717/124 |
| 2006/0253742 A1* | 11/2006 | Elenburg ............ G06F 11/3414 714/38.14 |
| 2009/0132920 A1* | 5/2009 | Deyo ..................... G06Q 10/10 715/708 |
| 2013/0019170 A1* | 1/2013 | Mounty .............. G06F 11/3688 715/704 |

(Continued)

FOREIGN PATENT DOCUMENTS

| JP | 06-083598 A | 3/1994 |
| JP | 11-110202 A | 4/1999 |
| JP | 2011-118520 A | 6/2011 |

OTHER PUBLICATIONS

Kurlander, David, and Steven Feiner. "A history-based macro by example system." Proceedings of the 5th annual ACM symposium on User interface software and technology. 1992. (Year: 1992).*

(Continued)

*Primary Examiner* — Andrew T Chiusano
(74) *Attorney, Agent, or Firm* — Sughrue Mion, PLLC

(57) ABSTRACT

An information processing apparatus includes a recording unit that records an operation procedure of a piece of software operated in a region where a relative display position relationship among pieces of software is set, and generates control information that controls operation of the piece of software in accordance with the operation procedure.

19 Claims, 5 Drawing Sheets

(56) References Cited

U.S. PATENT DOCUMENTS

2015/0339213 A1\* 11/2015 Lee .................... G06F 11/3664
717/125
2018/0173614 A1\* 6/2018 Gong ................. G06F 11/3664

OTHER PUBLICATIONS

Nakamura, Toshio, and Takeo Igarashi. "An application-independent system for visualizing user operation history." Proceedings of the 21st annual ACM symposium on User interface software and technology. 2008. (Year: 2008).\*

\* cited by examiner

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-114120 filed Jun. 9, 2017.

BACKGROUND

(i) Technical Field

The present invention relates to an information processing apparatus and a non-transitory computer readable medium storing a program.

(ii) Related Art

There is a case where an operation procedure of software is recorded, and the software is automatically executed in accordance with the operation procedure recorded.

SUMMARY

According to an aspect of the invention, there is provided an information processing apparatus including a recording unit that records an operation procedure of a piece of software operated in a region where a relative display position relationship among pieces of software is set and that generates control information that controls operation of the piece of software in accordance with the operation procedure.

BRIEF DESCRIPTION OF THE DRAWINGS

Exemplary embodiments of the present invention will be described in detail based on the following figures, wherein.

DETAILED DESCRIPTION

Figure 1:
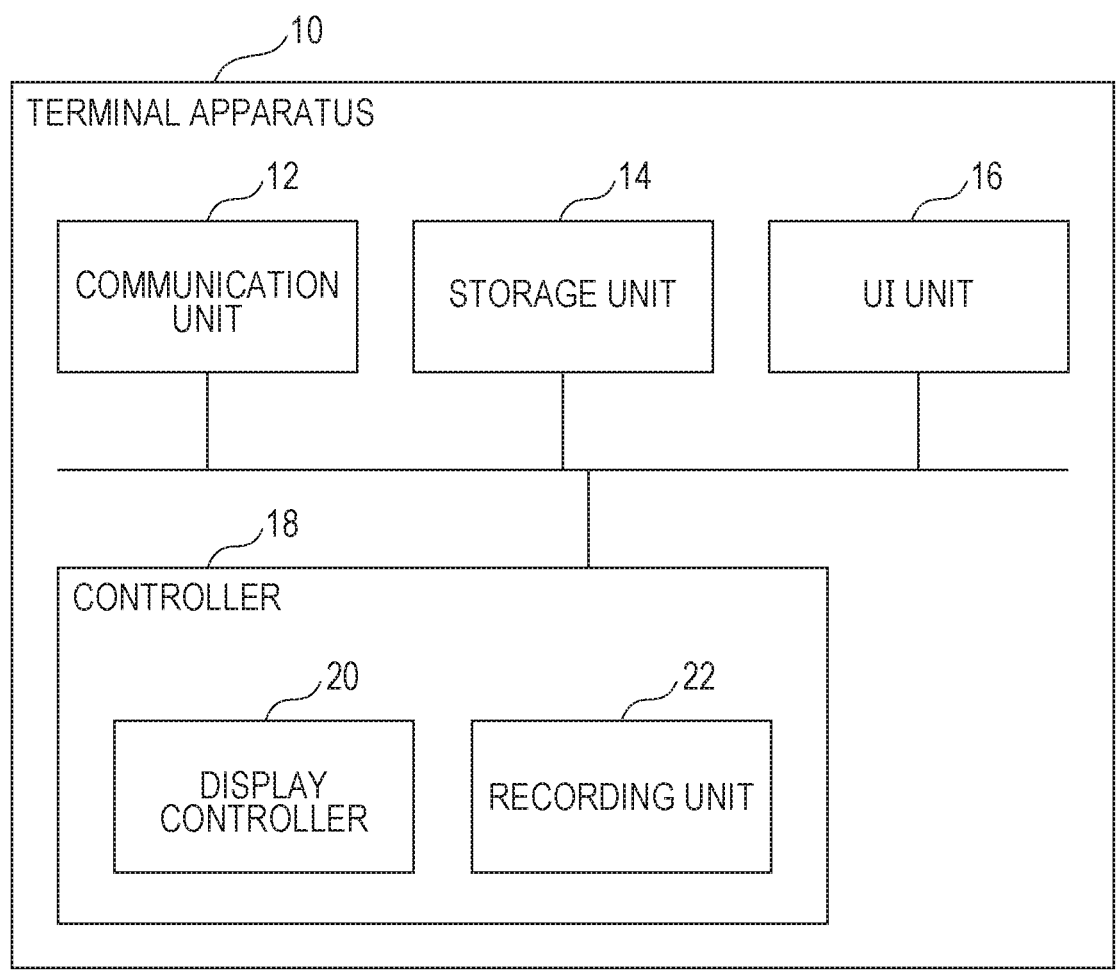
FIG. 1 is a block diagram illustrating a terminal apparatus according to an exemplary embodiment.

A terminal apparatus will be described as an example of an information processing apparatus according to an exemplary embodiment. FIG. 1 illustrates a terminal apparatus 10 according to the present exemplary embodiment.

The terminal apparatus 10 is, for example, an apparatus such as a personal computer (PC), tablet PC, smartphone, cellular phone, or the like, and has a function of executing software (programs), a function of recording a software operating procedure (execution procedure), and so forth. Examples of software include system software such as operating systems (OS), application software that executes specific processing, and so forth. The terminal apparatus 10 may be an apparatus such as a server or the like. The terminal apparatus 10 will be described in detail below.

A communication unit 12 is a communication interface that has a function of transmitting data to other apparatuses, and a function of receiving data from other apparatuses. The communication unit 12 may be a communication interface having a wireless communication function, or may be a communication interface having a wired communication function. Note that the terminal apparatus 10 does not necessarily have the communication unit 12.

A storage unit 14 is a storage device such as a hard disk or memory (e.g., a solid-state drive (SSD), etc.) or the like. The storage unit 14 stores various types of data, various types of software (system software, application software, etc.) and so forth. Information indicating addresses of other apparatuses may also be stored in the storage unit 14. The above-described information may be stored in separate storage devices respectively, or may be stored in the same storage device.

A user interface (UI) unit 16 is a user interface unit that includes a display unit and operating unit. The display unit is a display device such as a liquid crystal display or the like, for example. The operating unit is an input device such as a touch screen, keyboard, mouse, or the like, for example. The UI unit 16 may be a user interface combining a display unit and operating unit (including, for example, a touch-operated display, a device that electronically displays a keyboard or the like on a display, etc.).

A controller 18 has a function of controlling operations of each part of the terminal apparatus 10. The controller 18 also includes a display controller 20 and a recording unit 22.

The display controller 20 has a function of displaying various types of information on the display unit of the UI unit 16. For example, the display controller 20 displays a so-called desktop screen (basic operating screen) on the display unit of the UI unit 16, and displays, on this desktop screen, images (so-called icons) associated with application software, images (icons) associated with files such as document data, image data, and so forth, images (icons) associated with folders storing application software or files, and so forth. In a case where application software is executed (activated), the display controller 20 displays an operation screen of the application software on the display unit of the UI unit 16. For example, in a case where word processor application software is activated, a document editing screen is displayed, and in a case where spreadsheet application software is activated, a spreadsheet screen is displayed. Further, application software such as an image viewer, graphics editor, Web browser, or the like, may be executed, and the image viewer, graphics editing screen, Web browser, or the like, may be displayed.

The display controller 20 also causes the display unit of the UI unit 16 to display a predetermined reference image, and causes the display unit to display a software display region in a case where the user specifies the reference image. A list of application software (e.g., a list of software identification information to identify application software) is displayed within the software display region. Examples of software identification information include images associated with application software, text strings indicating names or IDs of application software, and so forth. A relative display position relationship among pieces of application software is set in the software display region. For example, the display position of each software identification information may be fixed in the software display region. Upon specifying software identification information displayed in the software display region by the user, application software associated with the specified software identification information is activated.

File identification information for identifying a file, such as document data, image data, or the like, may be displayed within the software display region. Examples of file identification information include images associated with files, text strings indicating names of flies, and so forth. In a case where both application software and files are displayed within the software display region (i.e., in a case where both software identification information and file identification information are displayed), a relative display position relationship therebetween is set. Upon specifying file identification information displayed in the software display region by the user, application software associated with a file associated with the specified file identification information is activated, and files are displayed by the application software. As a matter of course, folder identification information of identifying folders (e.g., images associated with folders, text strings indicating folder names, and so forth) may be displayed within the software display region.

The recording unit 22 has a function of recording an operation procedure of the application software operated in the above-described software display region (e.g., the order in which application software is specified and executed), and generating control information for controlling operation of the application software in accordance with the operation procedure. The application software may be operated in accordance with the control information in the terminal apparatus 10 that has recorded the operation procedure (e.g., application software may be specified and executed), or the application software may be operated in accordance with the control information in an apparatus (e.g., another PC or the like) other than the terminal apparatus 10 that has recorded the operation procedure.

Also, in a case where software identification information and file identification information are displayed in the software display region, and application software and files are operated in the software display region, the recording unit 22 may record the operation procedure thereof, and generate control information for controlling operation of the application software and files in accordance with the operation procedure. In a case where folder identification information is displayed in the software display region and folders are operated in the software display region as well, the operation procedure thereof may be recorded and control information generated.

So-called robotic process automation (RPA) may be realized in the present exemplary embodiment, when the above-described control information is used as software (RPA software) for realizing RPA. For example, RPA is realized by executing the application software in virtual space in accordance with the above-described control information. For example, standard processing such as work and so forth that can be realized by data input and a combination of multiple pieces of application software, processing such as data collection and analysis, processing of learning and judging based on data, and so forth, may be performed in RPA.

Processing performed by the terminal apparatus 10 will be described below in further detail.

Figure 2:
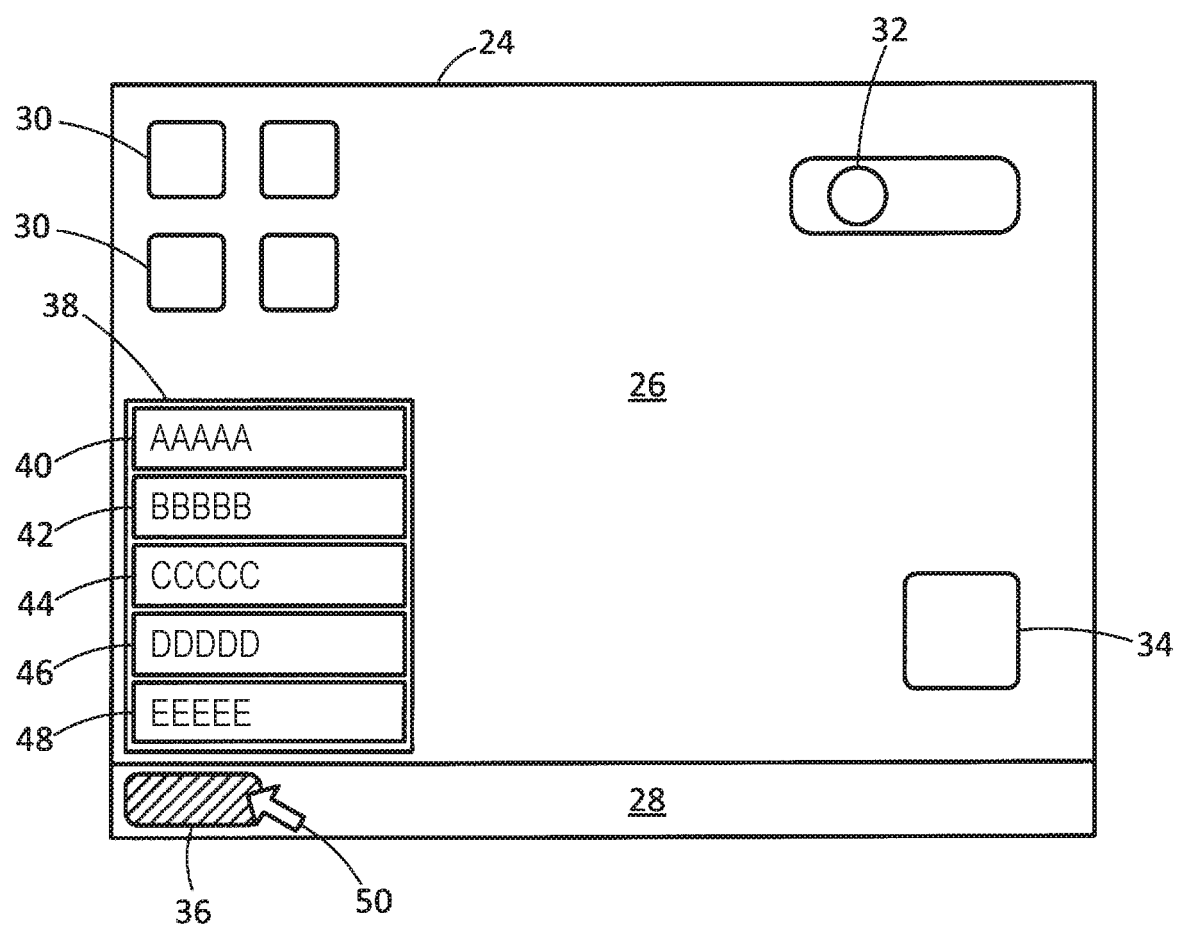
FIG. 2 is a diagram illustrating a screen.

A screen displayed on the display unit of the UI unit 16 will be described with reference to FIG. 2. FIG. 2 is a diagram illustrating a screen 24 that is displayed on the display unit of the UI unit 16. The screen 24 is a desktop screen that serves as a basic operation screen. In a case where the OS is activated for example, the display controller 20 causes the display unit to display the screen 24. The screen 24 includes a basic display region 26 and a taskbar region 28.

Displayed in the basic display region 26 are images 30 associated with application software, files, folders, or the like (e.g., icons associated with application software, icons associated with files, icons associated with folders, and so forth). In a case where application software is executed (activated), an operation screen of the application software (e.g., a screen for document editing, a spreadsheet screen, an image viewer, a graphics editing screen, a Web browser, etc.) is displayed in the basic display region 26.

A recording start button image 32 for giving an instruction to start recording of an operation procedure is displayed on the basic display region 26. In a case where the user specifies the recording start button image 32 and gives an instruction to start recording, for example (in a case where the user has pressed the recording start button image 32, for example), the recording unit 22 starts recording of the operation procedure, and generates control information. In a case where functions of the recording unit 22 are realized by collaboration between hardware and software, and the software (software for the recording unit 22) has been activated, the image 34 associated with the software may be displayed in the basic display region 26. The image 34 is, for example, an image of a screen that is displayed at the time of executing the software for the recording unit 22 and that has been minimized. Minimizing the screen gives the user a clearer view of the basic display region 26. When an operation procedure is being recorded, the recording unit 22 may end recording of the operation procedure when the user presses the recording start button image 32, or may end recording of the operation procedure when the user presses a recording end button image (an image omitted from illustration).

The taskbar region 28 is a laterally-elongated region displayed at a bottom region of the screen 24. The taskbar region 28 may display images or the like associated with predetermined application software, files, or folders. The taskbar region 28 may display images associated with application software already activated. The taskbar region 28 may alternatively be displayed at a region other than the bottom of the screen 24. For example, the taskbar region 28 may be a laterally-elongated region displayed at a top region of the screen 24, or may be a longitudinally-elongated region displayed at either the right side or left side of the screen 24.

A reference image 36 is displayed in the taskbar region 28. The reference image 36 corresponds to an example of a button image causing a software display region 38 to be displayed. For example, when the user presses the reference image 36, the display controller 20 causes the software display region 38 to be displayed on the screen 24. The reference image 36 is displayed at a predetermined position on the screen 24. In the example illustrated in FIG. 2, the reference image 36 is displayed at the lower left corner of the screen 24. Note that alternatively, the reference image 36 may be displayed at the upper right corner, lower right corner, or upper left corner of the screen 24 or at a middle position of the taskbar region 28, or the like.

A list of application software is displayed within the software display region 38. The software display region 38 may display a list of all application software installed in the terminal apparatus 10, or may display a list of part of the application software out of all application software. The example illustrated in FIG. 2 shows images 40, 42, 44, 46, and 48, arrayed within the software display region 38 as software identification information. The image 40 is an image associated with application software "AAAAA". The image 42 is an image associated with application software "BBBBB". The image 44 is an image associated with application software "CCCCC". The image 46 is an image associated with application software "DDDDD". The image 48 is an image associated with application software "EEEEE". For example, in a case where the user presses the image 40, the application software "AAAAA" associated with the image 40 is activated. This is the same for the other pieces of application software as well. Note that a text string indicating the application software may be included in the corresponding image.

Application software displayed in the software display region 38 is software that has been installed in the terminal apparatus 10 (software stored in the storage unit 14, for example), and is software that can be executed using the terminal apparatus 10. The application software is a program that can be indirectly operated from apparatuses other than the terminal apparatus 10 in which the application is installed, by a remote login function such as remote desktop or the like, but cannot be directly operated.

A relative display position relationship has been set among the images 40, 42, 44, 46, and 48 within the software display region 38. For example, the display position of each image is fixed. The images are arrayed and displayed in the order of images 40, 42, 44, 46, and 48 from the upper side to the lower side of the software display region 38 in the example illustrated in FIG. 2. This display position relationship is set beforehand, for example.

The reference image 36 is equivalent to the start button displayed on the desktop screen in Windows (a registered trademark), for example. Of course, UNIX (a registered trademark), Mac (a registered trademark) OS, or Linux (a registered trademark) may be used as the OS. The reference image 36 corresponds to a button image or the like in those OS for displaying a list of application software that has been installed.

Processing performed by the recording unit 22 will be described in detail below with reference to FIG. 2.

In a case where a record-taker has pressed the recording start button image 32, the recording unit 22 starts a recording operation procedure. For example, the record-taker may use a mouse or the like to press the recording start button image 32 by a cursor 50 displayed on the screen 24, or in a case where the UI unit 16 is configured using a touch screen, the record-taker may press the recording start button image 32 on the screen. Operations are performed using the cursor 50 in the following description. As a matter of course, operations may be performed without using the cursor 50.

Upon the reference image 36 being pressed by a record-taker using the cursor 50, the display controller 20 causes the software display region 38 to be displayed on the screen 24. The recording unit 22 records the position that the cursor 50 has specified on the screen 24. In a case where the reference image 36 is displayed at the lower left corner of the screen 24, the recording unit 22 records that this position has been specified.

Next, upon the cursor 50 being moved by the record-taker to specify an image displayed within the software display region 38 and the image being pressed by the record-taker using the cursor 50, the controller 18 activates the application software associated with the image. An example will be described here where the image 40 has been pressed, and the application software "AAAAA" associated with the image 40 is activated. In this case, the display controller 20 causes an operating screen for the application software "AAAAA" to be displayed on the screen 24. The recording unit 22 records the operation performed with regard to the image 40. For example, the recording unit 22 identifies the application software "AAAAA" that has been operated, based on the display position of the image 40 within the software display region 38. The recording unit 22 identifies the display position of the image that has been operated by determining what number image the operated image is from the reference position, using the display position of the reference image 36 as the reference position. For example, the recording unit 22 identifies what number image the operated image is from the reference image, by counting the number of images from the reference position to the operated image (the number including the operated image). The image 40 is the fifth image from the display position of the reference image 36, and therefore the recording unit 22 records that the fifth image has been operated. In a case where the record-taker operates the application software "AAAAA" on the operation screen, the recording unit 22 records the operation thereof. The recording unit 22 may also record movement of the cursor 50 (e.g., movement direction, amount of movement, position specified, etc.) on the screen 24.

Next, upon the cursor 50 being moved by the record-taker to specify another image (e.g., image 44) displayed within the software display region 38 and the image 44 being pressed by the record-taker using the cursor 50, the controller 18 activates the application software "CCCCC" associated with the image 44. The recording unit 22 records the operation performed with regard to the image 44. The image 44 corresponds to the third image from the display position of the reference image 36, and therefore the recording unit 22 records that the third image has been operated. The recording unit 22 also records the operation performed in the operation screen for the application software "CCCCC". The recording unit 22 may also record movement of the cursor 50.

The recording unit 22 records operations when other images within the software display region 38 are operated as well, in the same way as described above. The recording unit 22 then generates control information (corresponding to an example of RPA software) indicating a record of the operations. For example, in a case where the record-taker operates the reference image 36 (the image displayed at the lower left corner of the screen 24), then operates the image 40 (fifth image from the reference position), and then operates the image 44 (third image from the reference position), the recording unit 22 records the contents of the operations. Accordingly, recording is performed such that the software display region 38 is displayed first, followed by the application software "AAAAA" being executed, and then the application software "CCCCC" being executed.

The following is a description regarding a case of executing application software using control information. This execution may be performed at the terminal apparatus 10, or may be performed at an apparatus other than the terminal apparatus 10 (e.g., a PC). An example will be described here where execution is performed at a terminal apparatus (hereinafter referred to as "executing apparatus") other than the terminal apparatus 10. In this case, control information is extracted from the terminal apparatus 10 and stored in the executing apparatus. The control information may be transmitted from the terminal apparatus 10 to the executing apparatus via a communication path such as the Internet, a local area network (LAN), or the like. The control information may be transmitted from the terminal apparatus 10 to the executing apparatus via Near Field Communication such as Bluetooth (a registered trademark) or the like. The control information may be delivered from the terminal apparatus 10 to the executing apparatus by a portable recording medium such as a magnetic recording medium, memory, or the like.

The executing apparatus has the communication unit 12, storage unit 14, UI unit 16, and controller 18, similarly to the terminal apparatus 10, for example. The controller 18 of the executing apparatus does not have to include the recording unit 22. The pieces of application software "AAAAA", "BBBBB", "CCCCC", "DDDDD", and "EEEEE" have been installed in the executing apparatus, in the same way as in the terminal apparatus 10. The basic display region 26 and taskbar region 28 are displayed on the display unit of the UI unit 16 of the executing apparatus in the same way as on the screen 24, with the reference image 36 being displayed at the predetermined position in the taskbar region 28 (e.g., the position of the lower left corner of the screen 24). Upon the reference image 36 being pressed in the executing apparatus, the software display region 38 is displayed, and the images are displayed in the software display region 38, arrayed in the order of images 40, 42, 44, 46, and 48, from the upper side to the lower side, in the same way as in the terminal apparatus 10. The display position relationship is predetermined. That is to say, the relative display position relationship among the images within the software display region 38 displayed at the executing apparatus is the same as the relative display position relationship among the images within the software display region 38 displayed at the terminal apparatus 10 when recording the operation procedure.

In a case where an executor (reproducer) gives a start instruction for processing (reproduction processing) following the control information, the controller 18 executes each piece of application software in accordance with the control information. The reference image 36 (image displayed at the lower left corner of the screen 24) has first been operated by the cursor 50 when recording the operation procedure in the above-described example, and thus when executing (reproducing) the application software, the controller 18 causes the cursor 50 to be moved to the position at the lower left corner of the screen 24, and to press the image (the reference image 36) displayed at the position to which the cursor 50 is moved. Accordingly, the software display region 38 is displayed. When recording the operation procedure, the fifth image (image 40) from the display position of the reference image 36 (reference position) has been operated by the cursor 50, and thus when executing the application software, the controller 18 causes the cursor 50 to be moved to the fifth image (image 40) from the reference position, and to press the image (image 40) displayed at the position to which the cursor 50 is moved. For example, the controller 18 counts the number of images within the software display region 38 from the reference position, and causes the cursor 50 to be moved to the fifth image from the reference position. Accordingly, the application software operated when recording the operation procedure is identified based on the display position of the image. Upon the image 40 being pressed, the application software "AAAAA" associated with the image 40 is activated, and the controller 18 executes the recorded operation using the application software "AAAAA", based on the control information. That is to say, the operation performed using the application software "AAAAA" when recording the operation procedure is executed using the application software "AAAAA" activated when executing the application software. Next, the third image (image 44) from the display position of the reference image 36 (reference position) has been operated by the cursor 50 when recording the operation procedure, and thus when executing the application software, the controller 18 causes the cursor 50 to be moved to the third image (image 44) from the reference position, and to press the image (image 44) displayed at the position to which the cursor 50 is moved. Accordingly, the application software "CCCCC" associated with the image 44 is activated, and the controller 18 executes the recorded operations using the application software "CCCCC", based on the control information.

As described above, when an operation procedure is recorded in the present exemplary embodiment, the operation procedure of application software operated in the software display region 38 is recorded. The relative display position relationship among pieces of application software is set in the software display region 38. The application software operated when recording the operation procedure is identified based on the display position of an image associated with the application software. In a case where a software display region having the same display position relationship as the display position relationship when recording the operation procedure is used when executing the operation procedure, the application software is operated in accordance with the recorded operation procedure by operating an image in accordance with the display position of the image operated when recording the operation procedure.

Now, a comparative example will be described. In the comparative example, the movement of the cursor 50 (e.g., movement direction, amount of movement, position specified, etc.) is recorded, and the application software operated when recording the movement is identified and executed when reproducing the application software, based on the movement direction and amount of movement thereof. The comparative example will be described in detail with reference to FIG. 2. For example, assuming that the record-taker has moved the cursor 50 and pressed a specific image (icon) out of the multiple images 30 (icons), to execute application software associated with the image, the movement of the cursor 50 at this time is recorded. When executing the application software, the cursor 50 is automatically moved in accordance with the movement when recording, for example. In a case where the screen size and screen resolution when executing the application software are the same as the screen size and screen resolution when recording the movement of the cursor 50, the image specified when recording is pressed based on the movement of the cursor 50 that has been recorded, and the application software associated with the image is executed. However, in a case where the screen size and screen resolution when recording and the screen size and screen resolution when reproducing are not the same, when reproducing the application software, the image specified when recording the movement of the cursor is displayed at a different position on the screen from the position displayed when recording. In this case, the image specified when recording the movement of the cursor is not specified when executing the application software, and the application software associated with the image is not executed.

As opposed to the above-described comparative example, the relative display position relationship among pieces of application software is set in the present exemplary embodiment, and the application software specified when recording the operation procedure is identified by the display position relationship. Accordingly, the application software executed when recording the operation procedure is operated when executing the application software in accordance with the control information, even in a case where the screen size and screen resolution when executing the application software is different from the screen size and screen resolution when recording the operation procedure.

In the present exemplary embodiment, the reference image 36 for displaying the software display region 38 is displayed at a predetermined position (e.g., the lower left corner of the screen), and thus even in a case where the screen size and screen resolution when executing the application software is different from the screen size and screen resolution when recording the operation procedure, the operation procedure the reference image 36 is specified in accordance with the control information. That is to say, even in a case where the screen size and screen resolution have been changed, the position at the corner of the screen is fixed without being affected by the change, and thus the reference image 36 is specified in accordance with the control information when executing the application software.

Pieces of application software displayed within the software display region 38 may be pieces of application software having different functions from each other. In a case where multiple pieces of application software having different functions from each other are operated when recording the operation procedure, and the operation procedure is recorded, the multiple pieces of application software having functions different from each other are executed in accordance with the recorded operation procedure, when executing the application software. In this case, the multiple pieces of application software having functions different from each other are executed in sequence.

Modifications will be described below.

Modification 1

Figure 3:
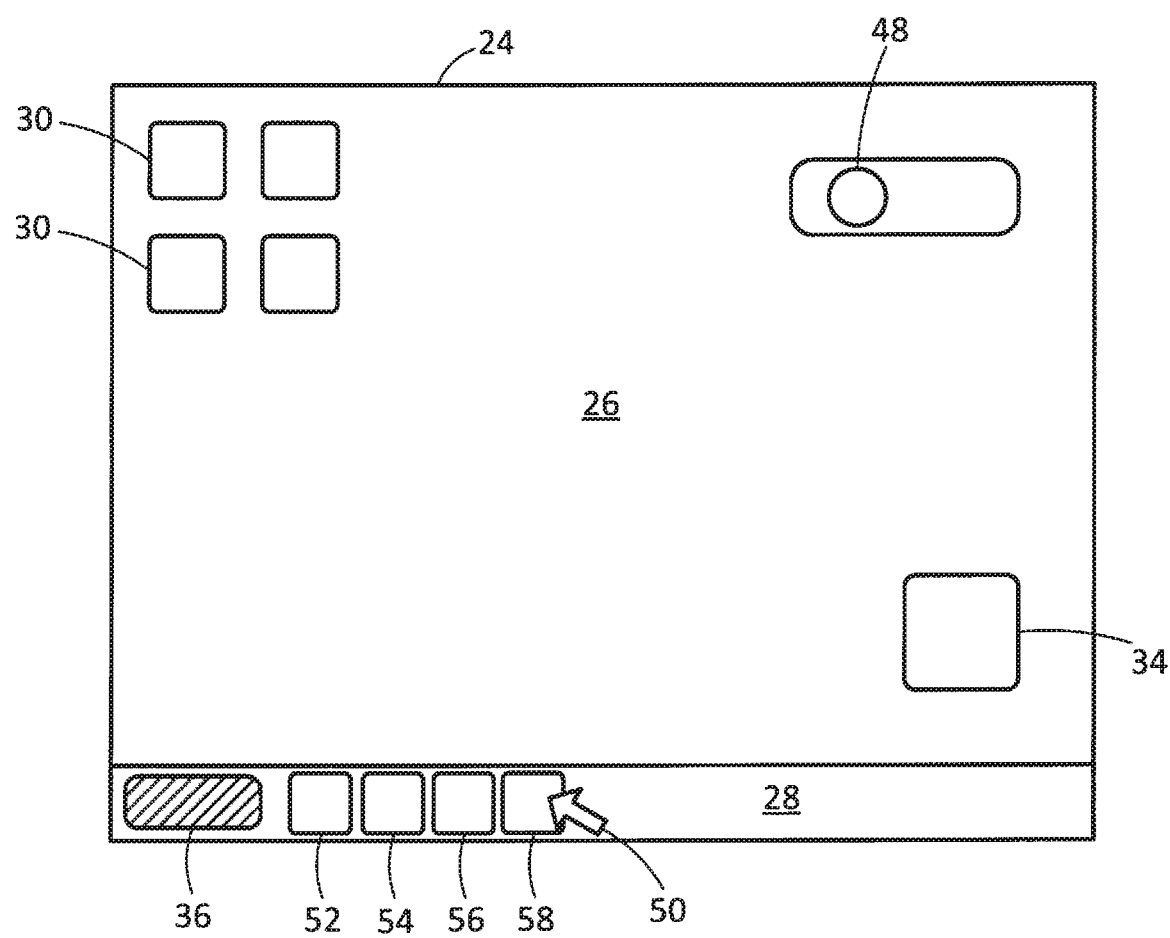
FIG. 3 is a diagram illustrating a screen.

Modification 1 will be described with reference to FIG. 3. FIG. 3 is a diagram illustrating the screen 24 according to Modification 1.

Images (e.g., icons) associated with pieces of application software are displayed in the taskbar region 28, these being images 52, 54, 56, and 58, for example. A relative display position relationship is set among the images 52, 54, 56, and 58. For example, display positions of the images are fixed. In the example illustrated in FIG. 3, the images are arrayed and displayed in the order of images 52, 54, 56, and 58 with respect to the display position of the reference image 36. The display position relationship is set beforehand, for example.

The recording unit 22 identifies the operated application software, based on the display position of the image operated within the taskbar region 28 and records the operation of the application software. The recording unit 22 identifies the display position of the operated image, by determining what number image from the reference position the operated image corresponds to with the display position of the reference image 36 as a reference. For example, the recording unit 22 determines what number image the operated image is from the reference image, by counting the number of images from the reference position to the operated image (the number including the operated image). In a case where the image 52 is operated by the record-taker for example, the image 52 corresponds to the first image from the display position of the reference image 36, and thus the recording unit 22 records that the first image has been operated. This is the same for subsequent operations as well, and control information is generated by the recording unit 22.

Images 52, 54, 56, and 58 are displayed within the taskbar region 28 as the images displayed at the executing apparatus, in the same way as on the screen 24 illustrated in FIG. 3. The display position relationship among the images is the same as the display position relationship among the images illustrated in FIG. 3. The controller 18 of the executing apparatus executes the application software operated when recording the operation, in accordance with the control information, in the same way as in the above-described exemplary embodiment. The controller 18 identifies and executes the application software executed when recording the operation procedure, based on the display position of the images within the taskbar region 28.

Modification 2

The recording unit 22 may identify application software operated when recording the operation procedure, based on identification information of the application software (software identification information) and record the operation procedure. The name or ID of application software is used as the software identification information in Modification 2. In a case where the image 40 is specified by the record-taker in the example illustrated in FIG. 2 for example, the recording unit 22 acquires the software identification information indicating the name or ID of application software associated with the image 40, and generates control information including the software identification information. When executing the application software, the controller 18 of the executing apparatus uses the software identification information included in the control information as a search key to search for the application software associated with the software identification information, and executes the application software that has been found.

Modification 3

The recording unit 22 may identify operated application software by counting the number of pixels from the display position of the reference image 36 (reference position) to the operated image (e.g., image 40) and record the operation thereof. In a case where the image 40 is specified by the record-taker in the example illustrated in FIG. 2 for example, the recording unit 22 counts the number of pixels from the reference position to the image 40, and generates control information including the number of pixels. When executing the application software, the controller 18 of the executing apparatus moves the cursor 50 from the reference position by the number of pixels included in the control information, and specifies the image at the destination of movement. Accordingly, the application software associated with the image is executed.

In a case where the screen size and screen resolution when executing the application software is the same as the screen size and screen resolution when recording the operation procedure, the application software executed when recording is specified and executed based on the number of pixels.

The recording unit 22 may also record information (environment information) indicating the display environment when recording the operation procedure, and generate control information including the environment information. Examples of display environment include screen size and screen resolution. When executing the application software, the controller 18 of the executing apparatus changes the number of pixels when recording the operation procedure, based on the difference between the display environment indicated by the environment information (screen size and screen resolution when recording) included in the control information and the display environment (screen size and screen resolution when reproducing) when executing the application software, and moves the cursor 50 based on the number of pixels after the changing. For example, in a case where the screen size when executing the application software is larger than the screen size when recording the operation procedure, the controller 18 of the executing apparatus increases the number of pixels, as compared to that when recording the operation procedure, by an amount corresponding to the difference in size, and moves the cursor 50 from the reference position by the number of pixels after the increasing, to specify the image at the destination of movement. In a case where the screen size when executing the application software is larger than the screen size when recording the operation procedure, the positions of the images within the software display region 38 change by an amount corresponding to the difference in size. Increasing the number of pixels by an amount corresponding to the difference and moving the cursor 50 in accordance with the increased number of pixels enable the application software specified when recording the operation procedure to be specified and executed. This is the same for cases where the screen size when executing the application software is smaller than the screen size when recording the operation procedure, and cases where the screen resolution when executing the application software differs from the screen resolution when recording the operation procedure, as well.

Modification 4

Figure 4:
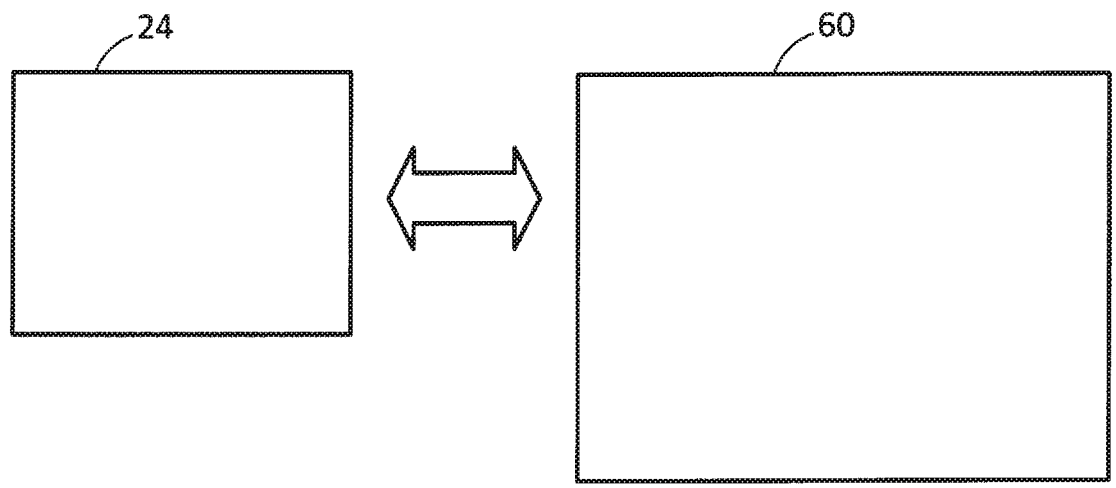
FIG. 4 is a diagram illustrating a screen.

Modification 4 will be described with reference to FIG. 4. FIG. 4 illustrates a screen according to Modification 4. The screen 24 is a screen when recording the operation procedure, and a screen 60 is a screen when executing the application software. The display environment (e.g., screen size and screen resolution) of the screen 60 is a different environment from the display environment of the screen 24.

In Modification 4, the recording unit 22 records the movement of the cursor 50 (e.g., movement direction, amount of movement, and position specified) when recording the operation procedure. The recording unit 22 also records the display environment when recording (e.g., screen size and screen resolution), when recording the operation procedure, and generates control information including the information indicating the display environment (environment information).

When executing the application software, the controller 18 of the executing apparatus reproduces the motion of the cursor 50 that has been recorded, thereby specifying and executing the application software executed when recording the operation procedure. At this time, the controller 18 of the executing apparatus changes the position specified by the cursor 50, based on the difference between the display environment (screen size and screen resolution when recording) indicated by the environment information included in the control information and the display environment (screen size and screen resolution when reproducing) when reproducing the application software. For example, if the screen resolution when recording the operation procedure is "1366×768" and the screen resolution when executing the application software is "1280×1024", the controller 18 of the executing apparatus in this case moves the cursor 50 with the position specified by the cursor 50 being changed by an amount corresponding to the difference in the screen resolutions, and specifies the image at the destination of movement. This is the same for cases where the screen size when executing the application software and the screen size when recording the operation procedure differ.

The recording unit 22 may record the operation procedure in a state where the screen size when recording is fixed to a predetermined screen size, in the above-described exemplary embodiment and Modifications 1 to 4. The predetermined screen size is a maximum size, for example. The screen size when executing the application software is also fixed to the predetermined screen size (e.g., maximum size), and the application software is specified and executed in accordance with control information in this state. Thus, recording and reproduction of the operation procedure is performed with the screen sizes set to the same size, if the maximum size of the screen of the terminal apparatus 10 used for recording the operation procedure and the maximum size of the screen of the executing apparatus are the same.

The recording unit 22 may also generate control information including information relating to the display device of the terminal apparatus 10 (information relating to the display device when recording). In a case where the display device of the terminal apparatus 10 used for recording the operation procedure and the display device of the executing apparatus (display device when reproducing) differ, the controller 18 of the executing apparatus may adjust the movement of the cursor 50 when reproducing, in accordance with the difference between information relating to the display device when recording the operation procedure and information relating to the display device when executing the operation procedure.

OTHER EXEMPLARY EMBODIMENTS

Figure 5:
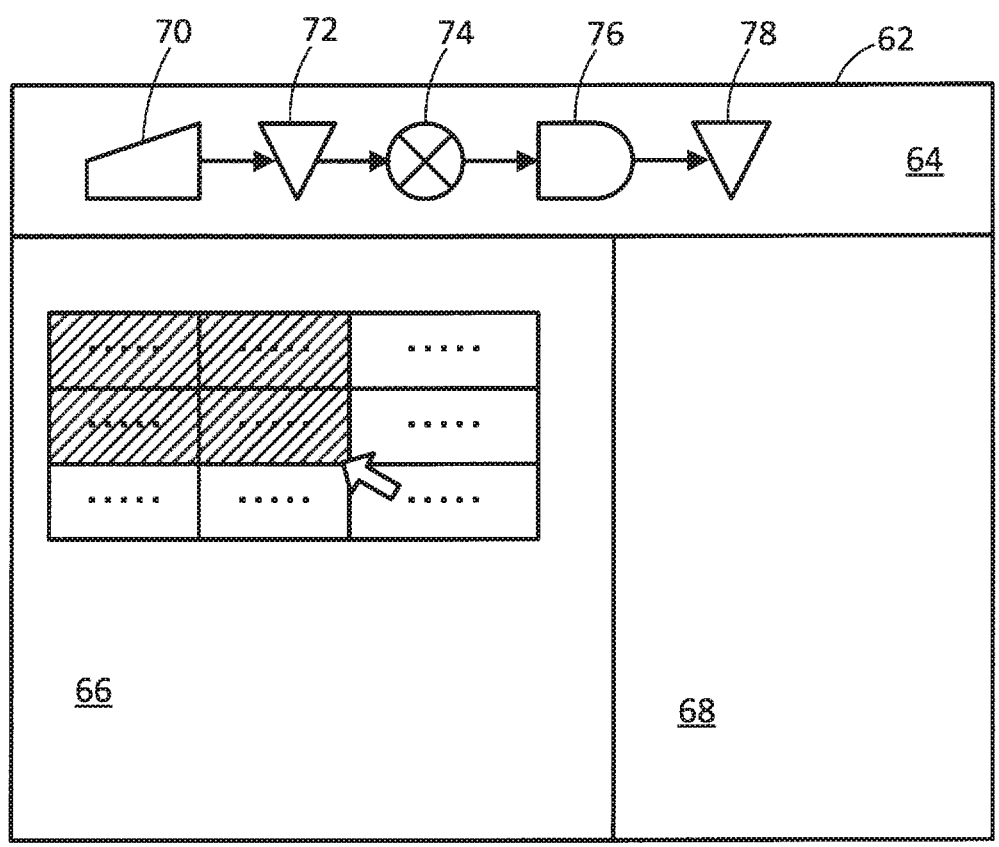
FIG. 5 is a diagram illustrating a screen.

Functions of confirming and editing control information will be described with reference to FIG. 5, as other exemplary embodiments. FIG. 5 illustrates an example of a confirmation screen.

When a confirmer (e.g., the record-taker, reproducer, administrator, some other person, etc.) uses the UI unit 16 and gives an instruction to confirm control information, the display controller 20 causes a confirmation screen 62 to be displayed on the display unit of the UI unit 16, and causes control information specified as an object of confirmation to be displayed within the confirmation screen 62.

The confirmation screen 62 includes, for example, a job flow display region 64, an operation content display region 66, and a result display region 68.

A job flow schematically representing the recorded operation procedure is displayed in the job flow display region 64. For example, images associated with pieces of application software executed when recording the operation procedure are arrayed in the order of operations. This display corresponds to the job flow. For example, images are arrayed and displayed in the order of images 70, 72, 74, 76, and 78. Each image is an image associated with application software. For example, when recording the operation procedure, application software associated with the image 70 is executed first, application software associated with the image 72 is executed next, then application software associated with the image 74 is executed next, and then application software associated with the image 76 is executed next, and finally application software associated with the image 78 is executed.

In a case where an image included in a job flow is specified, the display controller 20 causes the content of operation to be displayed in the operation content display region 66, the content of operation being performed, when recording the operation procedure, using the application software associated with the image. When recording the operation procedure, the content of operation is recorded and control information including information indicating the content of operation is generated. The display controller 20 causes the content of operation to be displayed within the operation content display region 66, based on the control information. For example, in a case where the application software associated with the image 70 is spreadsheet application software, and the image 70 is specified by the confirmer, the content of operation performed, when recording the operation procedure, using the spreadsheet application software is displayed within the operation content display region 66. In the example illustrated in FIG. 5, a table used in the spreadsheet is displayed, and a moving image shows a partial region within the table being specified by a cursor. Thus, the content of operation when recording the operation procedure is displayed as a moving image.

Further, numerical values, calculation results, and so forth obtained from the spreadsheet, are displayed in the result display region 68.

The job flow may also be edited. For example, in a case where the order of array of the images included in the job flow is changed by the confirmer using the UI unit 16, the recording unit 22 changes the operation procedure following the order of array after the change, and generates control information indicating the operation procedure after the change. For example, in a case where the confirmer places the image 70 between image 72 and image 74, the order after the change includes images 72, 70, 74, 76, and 78, and the order of operations in the operation procedure after the change follow this order. When reproducing the operation procedure, application software is executed in accordance with the changed operation procedure.

Also, in a case where an image included in the job flow is deleted by the confirmer, the recording unit 22 may delete information indicating the content of operation relating to the application software associated with the deleted image from the control information. Further, in a case where a new image is added to the job flow by the confirmer, the recording unit 22 may add information indicating the content of operation relating to the application software associated with the added image to the control information.

Note that confirmation work of control information may be performed at an apparatus (e.g., an executing apparatus, confirmation apparatus, administrator apparatus, etc.) other than the terminal apparatus 10. In this case, the confirmation screen 62 is displayed at the apparatus. In a case where an apparatus other than the terminal apparatus 10 has the editing function, the operation procedure can be edited at the apparatus.

The above-described terminal apparatus 10 is realized by collaboration of hardware and software, for example. Specifically, the terminal apparatus 10 has one or multiple processors (not illustrated), such as a central processing unit (CPU) or the like. The functions of the parts of the terminal apparatus 10 are realized by the one or multiple processors reading out and executing programs stored in a storage device (not illustrated). The programs are stored in the storage device via recording media such as compact discs (CD) or digital versatile discs (DVD) or the like, or via communication paths such as networks or the like. As a further example, the parts of the terminal apparatus 10 may be realized by hardware resources such as processors, electronic circuits, application-specific integrated circuits (ASIC), or the like. Devices such as memory and so forth may be used in the realization thereof. As a further another example, the parts of the terminal apparatus 10 may be realized by digital signal processors (DSP), field-programmable gate arrays (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   at least one processor configured to execute:
   a recording unit that executes operations comprising:
   recording an operation procedure of a piece of software, among pieces of software, operated in a region where a relative display position relationship among the pieces of software is set, and
   generating control information that controls operation of the piece of software in accordance with the recorded operation procedure,
   wherein, in the recording the operation procedure of the piece of software, the piece of software is identified by a relative display position relationship of the piece of software to another one of the pieces of software,
   wherein the control information identifies the piece of software by the recorded relative display position relationship of the piece of software to the another one of the pieces of software,
   wherein the at least one processor is further configured to execute a display controller that controls display of a confirmation screen displaying the operation procedure recorded by the recording unit, and
   wherein the confirmation screen displays the recorded operation procedure as a moving image.

2. The information processing apparatus according to claim 1, wherein the pieces of software are executable in an apparatus where the pieces of software are installed.

3. The information processing apparatus according to claim 1, wherein the information processing apparatus is configured to control a list of images associated with the pieces of software to be displayed in the region, and
   wherein the piece of software operated is identified using a relative display position of an image to another image in the list of images.

4. The information processing apparatus according to claim 1, wherein the piece of software operated is identified using identification information of software.

5. The information processing apparatus according to claim 1, wherein the piece of software operated is identified by counting pixels on a display screen.

6. The information processing apparatus according to claim 1,
   wherein the information processing apparatus is configured to control, if a predetermined reference image is specified, the region to be displayed, and a list of the pieces of software to be displayed in the region.

7. The information processing apparatus according to claim 1, wherein the pieces of software have functions different from each other.

8. The information processing apparatus according to claim 1, wherein the information processing apparatus is configured to control operation of the piece of software in accordance with the control information, in an apparatus that is different from the apparatus where the operation procedure has been recorded.

9. The information processing apparatus according to claim 8, wherein the information processing apparatus is configured to specify, when executing the piece of software in accordance with the control information, a display position of the piece of software in accordance with the control information, and to control the piece of software to be operated.

10. The information processing apparatus according to claim 9, wherein the information processing apparatus is configured to change a position that is specified when the piece of software is executed in response to a difference between a display environment when the operation procedure is recorded and a display environment when the piece of software is executed.

11. The information processing apparatus according to claim 10, wherein the recording unit records information indicating the display environment when the operation procedure is recorded, along with recording the operation procedure.

12. The information processing apparatus according to claim 10, wherein the environment comprises at least one of screen size and screen resolution.

13. The information processing apparatus according to claim 1, wherein the recording unit records the operation procedure in a state where a size of a screen where the region is displayed is fixed to a predetermined size.

14. The information processing apparatus according to claim 13, wherein the predetermined size is a maximum size.

15. The information processing apparatus according to claim 1, wherein the display controller displays, in the confirmation screen, images associated with the pieces of software and arrayed in an order of operations in the operation procedure.

16. The information processing apparatus according to claim 15, wherein the display controller, if an image is specified among the images, controls display of content of an operation performed, when the operation procedure is recorded, using one of the pieces of software associated with the image.

17. The information processing apparatus according to claim 15, wherein the information processing apparatus is configured such that an order of operations of ones of the pieces of software associated with the images is modified by changing an order of arrangement of the images in the confirmation screen.

18. A non-transitory computer readable medium storing a program that, if executed, causes a computer to execute operations comprising:
  a recording unit that records an operation procedure of a piece of software, among pieces of software, operated in a region where a relative display position relationship among the pieces of software is set, and that generates control information that controls operation of the piece of software in accordance with the recorded operation procedure,
  wherein, in the recording the operation procedure of the piece of software, the piece of software is identified by a relative display position relationship of the piece of software to another one of the pieces of software,
  wherein the control information identifies the piece of software by the recorded relative display position relationship of the piece of software to the another one of the pieces of software,
  wherein the operations further comprise a display controller that controls display of a confirmation screen displaying the operation procedure recorded by the recording unit, and
  wherein the confirmation screen displays the recorded operation procedure as a moving image.

19. The information processing apparatus according to claim 1, wherein the pieces of software are displayed in a predetermined sequential order,
  wherein, in the recording the operation procedure of the piece of software, the piece of software is identified by a relative position of the piece of software within the predetermined sequential order, and
  wherein the control information identifies the piece of software by the recorded relative position relationship of the piece of software within the predetermined sequential order.

* * * * *